(12) United States Patent
Brunnberg

(10) Patent No.: US 10,306,871 B2
(45) Date of Patent: Jun. 4, 2019

(54) FEEDING APPARATUS WITH A PECKING BLOCK

(71) Applicant: BIG DUTCHMAN INTERNATIONAL GMBH, Vechta (DE)

(72) Inventor: Holger Brunnberg, Osnabrück (DE)

(73) Assignee: BIG DUTCHMAN INTERNATIONAL GmbH, Vechta (DE)

( * ) Notice: Subject to any disclaimer, the term of this patent is extended or adjusted under 35 U.S.C. 154(b) by 479 days.

(21) Appl. No.: 15/145,845

(22) Filed: May 4, 2016

(65) Prior Publication Data

US 2016/0324127 A1    Nov. 10, 2016

(30) Foreign Application Priority Data

May 5, 2015    (DE) .................... 20 2015 102 303 U

(51) Int. Cl.
*A01K 1/10*  (2006.01)
*A01K 39/012*  (2006.01)
*A01K 5/02*  (2006.01)
*A01K 39/01*  (2006.01)

(52) U.S. Cl.
CPC .......... *A01K 39/012* (2013.01); *A01K 5/0233* (2013.01); *A01K 5/0241* (2013.01); *A01K 39/0106* (2013.01)

(58) Field of Classification Search
CPC .. A01K 39/01; A01K 39/012; A01K 39/0125; A01K 39/0106; A01K 5/0233; A01K 5/0241
See application file for complete search history.

(56) References Cited

U.S. PATENT DOCUMENTS

| 1,094,110 | A | * | 4/1914 | Baker | ............... | A01K 39/012 |
| | | | | | | 119/70 |
| 1,105,885 | A | * | 8/1914 | Crowell | ............ | A01K 39/012 |
| | | | | | | 119/70 |
| 1,108,566 | A | * | 8/1914 | Foster | ............... | A01K 39/012 |
| | | | | | | 119/52.2 |
| 1,112,068 | A | * | 9/1914 | Keller | ............... | A01K 39/012 |
| | | | | | | 119/70 |

(Continued)

FOREIGN PATENT DOCUMENTS

DE    20 2012 006 307    9/2012
DE    20 2013 010 019    1/2014

(Continued)

*Primary Examiner* — Richard G Davis
(74) *Attorney, Agent, or Firm* — Price Heneveld LLP

(57) ABSTRACT

A feeding apparatus for poultry is disclosed, and comprises a feed source, a feed line formed at the feed source, a feed valve mechanism arranged in the feed line and which in a closed valve position blocks feed from passing through the feed line and in an open valve position allows feed to pass through the feed line. The feeding apparatus has a pecking block which is moveably mounted and mechanically coupled to the feed valve mechanism in such a way that the feed valve mechanism is closed when the pecking block is in a neutral position and the feed valve mechanism is open when the pecking block is in a deflected position due to pecking at the pecking block.

20 Claims, 3 Drawing Sheets

(56) References Cited

U.S. PATENT DOCUMENTS

| | | | | | |
|---|---|---|---|---|---|
| 1,118,629 | A | * | 11/1914 | Bowers | A01K 39/012 119/70 |
| 1,132,973 | A | * | 3/1915 | Rappleye | A01K 39/012 119/52.2 |
| 1,141,981 | A | * | 6/1915 | Sexton | A01K 39/012 119/70 |
| 1,162,010 | A | * | 11/1915 | Zenger | A01K 39/012 119/70 |
| 1,253,002 | A | * | 1/1918 | Collins | A01K 39/012 119/70 |
| 1,498,220 | A | * | 6/1924 | Winkler | A01K 39/012 119/70 |
| 3,515,098 | A | * | 6/1970 | Thurmond | A01K 5/0233 119/51.01 |
| 3,677,230 | A | * | 7/1972 | Braden | A01K 61/80 119/51.04 |
| 3,688,743 | A | * | 9/1972 | Rack | A01K 61/80 119/51.04 |
| 4,602,757 | A | * | 7/1986 | Signorelli | A01K 39/0106 248/223.41 |
| 4,799,455 | A | * | 1/1989 | O'Kelley | A01K 5/0233 119/51.01 |
| 4,945,859 | A | * | 8/1990 | Churchwell | A01K 5/0275 119/54 |
| 5,479,879 | A | * | 1/1996 | Biek | A01K 39/0113 119/52.2 |

FOREIGN PATENT DOCUMENTS

| | | |
|---|---|---|
| GB | 29528 | 9/1913 |
| GB | 171929 | 2/1921 |

* cited by examiner

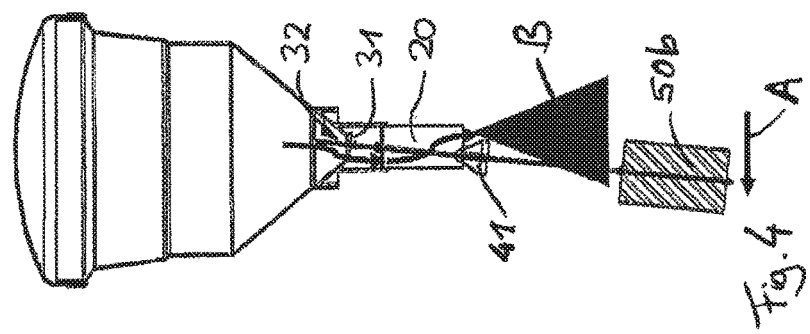
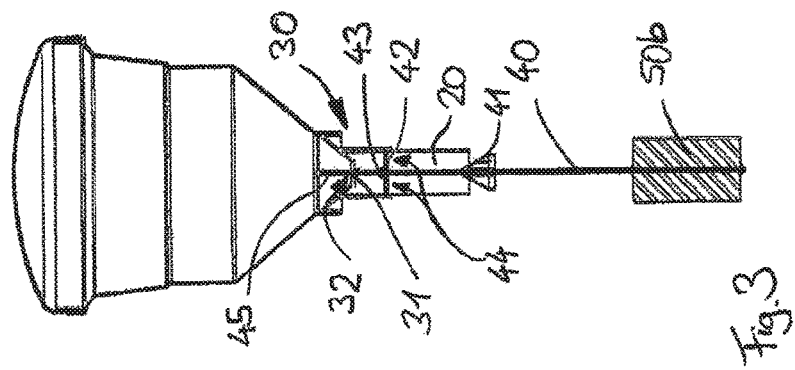

FEEDING APPARATUS WITH A PECKING BLOCK

CROSS-REFERENCE TO FOREIGN PRIORITY APPLICATION

The present application claims the benefit under 35 U.S.C. § 119(b) of German Application No. DE 202014102303.0 filed May 5, 2015, entitled "Feeding Apparatus with a Pecking Block.

FIELD OF THE INVENTION

The present disclosure relates to a feeding apparatus for poultry, comprising a feed source, a feed line formed at the feed source, a feed valve mechanism which is arranged in the feed line and which in a closed valve position blocks feed from passing through the feed line and in an open valve position allows feed to pass through the feed line.

BACKGROUND OF THE INVENTION

Feeding devices are used in poultry keeping to provide the animals with feed. In addition to the food uptake thus achieved, the other main activities of animals in poultry keeping facilities include water uptake, free movement, laying eggs, where relevant, and dust bathing in the litter or in the free-range area. One problematic aspect is that these activities are not sufficient for some of the poultry. This can then lead to aggressive behaviours such as feather pecking and cannibalism. This can develop into a major problem, particularly in flocks whose beaks have not been trimmed.

Counteracting the abnormal behaviour among poultry that results from this frustration, by providing the poultry with further material with which to interact, and other activities they can engage in, is basically known. One option is to arrange one or more pecking stones in the area where the animals are kept. Such pecking stones are placed in the litter or suspended and are used to provide the animals with additional activities, and the pecking stones can also cause the beak to be worn down, thus serving a natural function for the animals. However, one disadvantage is that the poultry quickly loses the incentive to engage with the pecking stone and then returns to the old, unnatural patterns of behaviour.

Racks in the form of hay or straw bales, or containers filled with hay or straw, have proved to be a more long-lasting form of activity, with less tendency to lose its attractiveness. In this case, the animals peck the hay or the straw from the rack, thus finding an activity that, while not losing its attractiveness for the animals quite as quickly, is not an interesting activity over the long term, either.

Another proven option is to provide plastic elements made of such a material that is sufficiently strong that the animals cannot eat the plastic. These plastic elements can be distributed in the litter or suspended above it, thus forming another potential activity, but one that is only briefly attractive.

Finally, feed supplements have been shown in the prior art to be one way of increasing the potential activities for poultry. Beside the actual feeding apparatus for feeding the animals, an additional feeding apparatus is also placed in the area where the animals are kept, for additional feeding of wheat, grain, grit, and limestone, for example. However, these measures are costly, and due to the general ease with which the animals can access these feed supplements, the effect of providing an additional activity is generally short-lived.

SUMMARY OF THE INVENTION

The object of the invention is to provide an apparatus for more species-appropriate behaviour and a form of poultry keeping that results in less abnormal behaviour among the poultry.

This object is achieved, according to the invention, by means of a feeding apparatus of the kind initially described, which is characterised by a pecking block which is moveably mounted and mechanically coupled to the feed valve mechanism in such a way that the feed valve mechanism is closed when the pecking block is in a neutral position and the feed valve mechanism is open when the pecking block is in a deflected position due to pecking at the pecking block.

The feeding apparatus according to the invention is characterised by a dual function which encourages the poultry being kept to behave naturally, not only in respect of feeding habits, but also with regard to social behaviour. According to the invention, the poultry obtain their feed from a feed source, but the dispensing of feed from the source is triggered by the poultry pecking at a pecking block. In this way, the two activities, namely pecking at the pecking block and feeding, are not separated from each other as in the prior art, but are combined to form a communal pattern of behaviour. By pecking at the pecking block, the poultry can achieve the required deflection and thus cause feed to be dispensed from the feed source. Due to this combined functional effect, the incentive for the poultry to engage with the pecking block is permanently maintained and integrated in normal daily needs. The animals' frustration is significantly reduced as a result, and additional functions, such as beak abrasion or mineral uptake, can be achieved with the pecking block.

A feed hopper, for example, can be used as a feed source in this connection. A feed hopper stores a certain amount of feed and can be filled manually from feed sacks or the like, or filled at intervals via a feed supply line which can be permanently installed in the barn. A feed supply line can also be used as a feed source. In this case, the feed is supplied via the feed supply line, which, in turn, can be permanently installed in the barn. There is no need for a feed hopper in such an embodiment, and the feed is stored temporarily in a section of the feed supply line and supplied periodically or continuously to that section.

A pecking block is generally to be understood as a material which encourages pecking, and which can be provided as a natural raw material, such as grit, or an artificially produced material in the form of a composite, a mineral composite, or in some other manner. The pecking block can basically come in different shapes, with rotationally symmetrical designs, such as cylindrical or conical shapes, being preferred. It is basically preferred that the pecking block can be mechanically and detachably coupled to the feed valve mechanism, so that the pecking block can be easily replaced when worn down, used up, or damaged. The neutral position of the pecking block should be understood here as the position which results, provided that the feeding apparatus is properly attached or mounted in the area where the animals are kept, when none of the poultry are pecking at the pecking block and when there is no external force acting on the pecking block. This neutral position is typically adopted due to the force of gravity, but is can also be stabilised additionally by spring load or the like. The deflected position is to be understood here as the position that can result by exerting a force on the pecking block. A single deflected position can basically be provided, but it is preferred that a plurality of deflected positions can be achieved by the action of a force on the pecking block, and that each of these deflected positions or some of these deflected positions lead to feed being dispensed and the feed valve mechanism being opened.

According to a first preferred embodiment, the pecking block is coupled to the valve device by means of a pendulum rod. Such a pendulum rod produces a swinging movement of the pecking block. This can basically be done in such a way that the pecking block is arranged at the top end of a pendulum rod which is swingingly mounted underneath it, or the pecking block is attached to the bottom end of a pendulum rod which is suspended swingingly above it. The pecking block itself should be arranged at a height with is easily reached for pecking by the poultry.

According to another preferred embodiment, the feed source is arranged above the feed valve mechanism and the feed drops out of the feed source under the influence of gravity when the valve mechanism is in the open position. In this preferred embodiment, the feed is dispensed from the feed source by the feed valve mechanism in a simple manner by using gravity. Gravity alone can basically be used, although conveying means can also be used as an additional aid. For example, a mixing or loosening movement can be imparted to the feed inside the feed source by actuating the feed valve mechanism, thus supporting the dispensing of feed.

According to another preferred embodiment, the pendulum rod is swingingly mounted in a pendulum bearing arranged above the pecking block. According to this embodiment, the pendulum rod is in the form of a suspended rod which is swingingly mounted at an upper end and which carries the pecking block at its bottom end. The advantage of such a configuration is that the pendulum rod is returned to the neutral position by the force of gravity and that this construction can be easily integrated into a feeding apparatus in which feed is dispensed by gravity actuation. The bearing for the pendulum rod can basically be arranged above or below the feed valve mechanism.

According to another preferred embodiment, the feed valve mechanism is formed by a through hole and a valve member which is mechanically coupled to the pecking block and which closes the through hole when in the neutral position and opens the through hole at least partially when in the deflected position. According to this embodiment, a robust and reliable design for the feed valve mechanism is provided, in which a valve member closes a through hole and said valve member is brought by deflection of the pecking block into a position in which the through hole is not completely closed, thus allowing the feed to pass through it. The valve member may be designed as a saucer-shaped or conical element, or as an element with some other geometric design. The valve member can be pressed into the through hole by an elastic closing force in order to produce a reliable closure and additionally to position it in the neutral position. The valve member can basically be arranged on the side of the through hole facing towards the feed supply or facing away from the feed supply, in order to bring about closure and the partial or complete release of feed by the through hole.

According to another preferred embodiment, the valve member is fixed to the top end of the pendulum rod and the pecking block is fixed to the bottom end of the pendulum rod. In this embodiment, the pendulum rod is designed as a suspended connector member between the feed valve mechanism and the pecking block. Fixing at the top end and fixing at the bottom end is to be understood here to mean that the valve member is fixed in the upper or lower end region of the pendulum rod, but not necessarily that it is fixed to the upper or the bottom end face.

According to another preferred embodiment, the pecking block includes an abrasive material. In this embodiment, the pecking block has an abrasive effect on the beaks of the poultry, thus resulting in natural beak abrasion during pecking. To that end, the pecking block can basically have an abrasive surface, or it can consist entirely of an abrasive material. What is meant here by abrasive is a surface approximately corresponding to an abrasive paper with a grit between 20 and 150.

According to another preferred embodiment, the pecking block includes a mineral material. In this embodiment, the pecking block is able to perform an additional function, in that it provides the poultry with minerals in addition to the feed. To achieve this feed additive effect, the pecking block is designed in such a way that small bits of the mineral material are detached by pecking from the pecking block and can be picked up by the poultry.

According to another preferred embodiment, the pecking block has a surface onto which the feed falls when in the deflected position and on which at least parts of the feed remain lying. In this embodiment, a horizontally oriented surface or a trough- or beaker-shaped area is formed on the pecking block, in which or on which the feed which falls out of the feed source can collect or be deposited. This embodiment basically requires that the pecking block be arranged underneath the feed dispensing hole. Due to the dropped feed being partly deposited when the pecking block is in the deflected position, the poultry are given an additional incentive to pick up the bits of feed thus deposited, also, and in particular, when the pecking block is in the neutral position. In this way, a new incentive is continually given, so that the poultry occupy themselves with the pecking block and move it out of the neutral position and into the deflected position.

According to yet another preferred embodiment, finally, the feed source has an outlet opening at a bottom end, which opens into the feed line, and the pecking block is fixed to the bottom end of a pendulum rod which carries in the upper end portion a valve disc which closes the outlet opening when in the neutral position and opens it at least partially when in the deflected position, and is swingingly mounted in the feed line at a position between the upper end portion and the bottom end. In this embodiment, the pendulum rod is swingingly mounted between the feed valve mechanism and the pecking block, thus allowing a favourable ratio between the amount of deflection and the valve action. This is also advantageous for arranging the pendulum bearing in a zone which is free of feed in the neutral position and can therefore be kept in a smoothly operating state. This allows the pendulum bearing to be provided in the feed line. This can be done, for example, by guiding the pendulum rod through a circumferential perforated ring which is fixed, for example welded, in the feed line, and which is suspended and swingingly mounted by means of a thickening above said ring. The circumferential openings in the ring then allow the feed to pass through when in the deflected position.

Another aspect of the invention concerns the use of a pecking block to trigger a release of feed from a feeding apparatus for poultry. The special advantage achieved with this use according to the invention is that the pecking block is a permanently attractive activity for the poultry to engage in, because during daily feeding it performs a function for the poultry by triggering the release of feed.

According to the invention, the feeding apparatus can be developed by this use of it, as described in the foregoing.

As regards the advantages, embodiment variants, and embodiment details of the method according to the present disclosure and its possible further developments, reference is made to the description provided herein of the respective features, as will be understood and appreciated by those skilled in the art upon studying the following specification, claims, and appended drawings.

BRIEF DESCRIPTION OF THE DRAWINGS

A preferred embodiment of the feeding apparatus disclosed herein shall now be described with reference to the Figures, in which:

FIG. 3 is a longitudinal, cross-sectional side view of the second embodiment of the feeding apparatus disclosed herein in a neutral position;

FIG. 4 is a longitudinal, cross-sectional view of the second embodiment of the feeding apparatus disclosed herein in a deflected position.

DETAILED DESCRIPTION OF THE PREFERRED EMBODIMENTS

Figure 2:
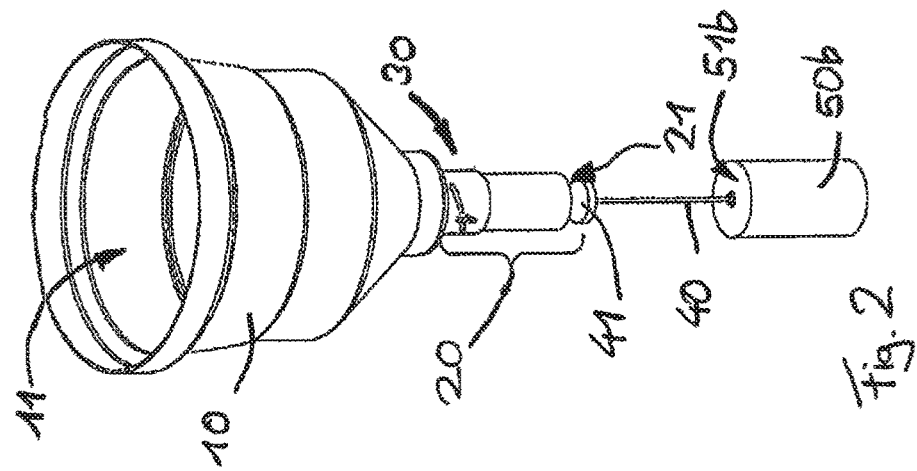
FIG. 2 is a perspective view of a second embodiment of the feeding apparatus disclosed herein.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Figure 1:
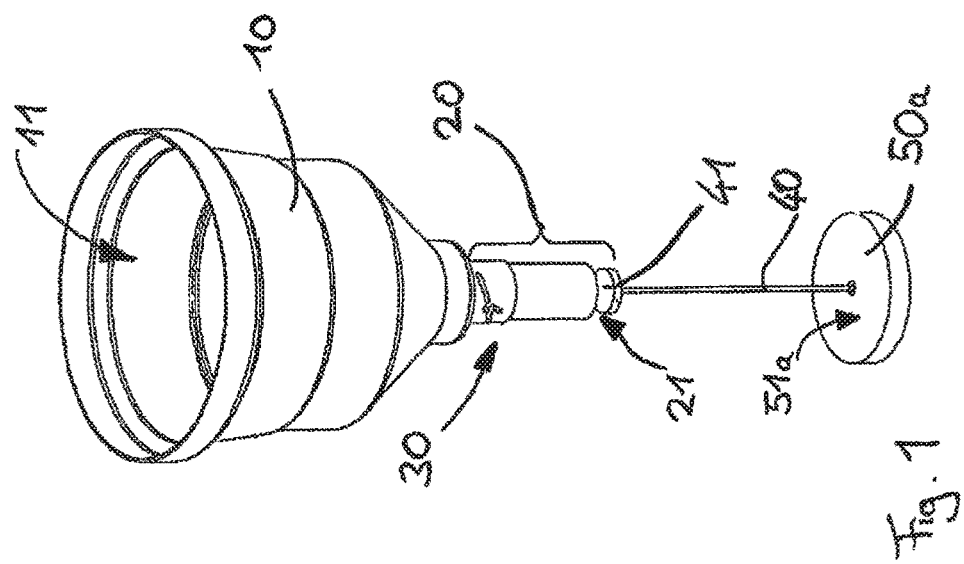
FIG. 1 is a perspective view of a first embodiment of the feeding apparatus disclosed herein.

Referring firstly to FIGS. 1 and 2, a feeding apparatus according to the invention includes a feed hopper 10. The feed hopper 10 has a large upper opening 11 for filling it with feed. In the downward direction, the feed hopper 10 has a conically tapering section which opens into a feed line 20.

Underneath feed hopper 10, a feed dispenser 30 is arranged in feed line 20. The feed dispenser 30 is used to block or release the flow of feed out of the feed hopper 10 through feed line 20. At the bottom end of feed line 20 there is an outlet opening 21 for the feed, from which the feed can flow vertically downwards.

A distribution cone 41 is arranged underneath the feed outlet opening 21. Distribution cone 41 has a surface tapering conically upwards, which causes the feed flowing out of the feed outlet opening 21 to be deflected and distributed laterally outwards.

Distribution cone 41 is fixed to a pendulum rod 40, the top end of which is swingingly mounted inside feed line 20 in a manner to be described in more detail below. A pecking block 50*a*, 50*b* is fixed to the bottom end of pendulum rod 40. Pecking block 50*a* of the first embodiment is designed as a flat, rotationally symmetric disc of circular cross section. This pecking block has an upper axial front face 51*a* on which the feed falling out of the feed outlet opening 21 remains lying and can be picked up by the poultry.

In the second embodiment, pecking block 50*b* is designed as a slender, elongated, solid cylindrical body. In this embodiment, the top end face 51*b* is smaller, but this geometry of the pecking block 50*b* provides a greater outer circumferential area on which the poultry can wear down their beaks.

Referring to FIGS. 3 and 4, the manner in which the inventive feeding apparatus operates shall now be described. In the neutral position shown in FIG. 3, pendulum rod 40 is arranged vertically. Feed dispenser 30 is formed by a valve member 31 which is rigidly fixed to the top end of the pendulum rod 40. The valve member 31 is disc-shaped and closes a valve opening 32 in the feed dispenser 30 in the neutral position shown. Pendulum rod 40 is swingingly mounted in an annular disc 42. For that purpose, the annular disc 42 has a central through bore, which is larger than the cross-sectional dimensions of the pendulum rod 40. Above this through bore, a pendulum bearing ring 43 is fixed to the pendulum rod 40, the outer diameter of the ring 43 being larger than the through bore in annular disc 42. Pendulum rod 40 is therefore prevented from slipping downwards out of the through bore in the annular disc 42, but it can swing in every horizontal direction about the pendulum axis defined in the annular disc 42 and about all horizontal axes. Annular disc 42 is provided with a plurality of lateral discharge holes 44 distributed around its circumference to allow feed to pass through feed line 20.

If the pendulum rod is laterally deflected by the action of a force A with a horizontal force component at the pecking block, as shown in FIG. 4, valve member 31 no longer closes valve opening 32 in the feed hopper 10 completely, so feed can flow into the feed line 20. This feed runs through lateral holes 44 of the annular disc 42, hits distribution cone 41, and is distributed by the latter such that part of the feed falls down beside the pecking block 50*a*, 50*b* and part of it falls onto the upper end face 51*a*, 51*b* of the pecking block 50*a*, 50*b*, as indicated by the triangular funnel B in FIG. 4. This feed can then be picked up by the poultry, and the feed lying on the upper end face 51*a*, 51*b* of the pecking block 50*a*, 50*b* stimulates the poultry to continue moving the pecking block 50*a*, 50*b* and thus to engage in such activity.

As can also be seen from the Figures, the pendulum rod 40 projects upwards a certain distance beyond the valve member, as mixing section 45, into feed hopper 10. This causes a loosening movement in the lower region of the feed hopper 10 when the pendulum rod 40 is deflected, thus counteracting any jamming and resultant clogging of the granular feed and ensuring the feed flows out reliably when the pendulum rod 40 is deflected.

Figure 5:
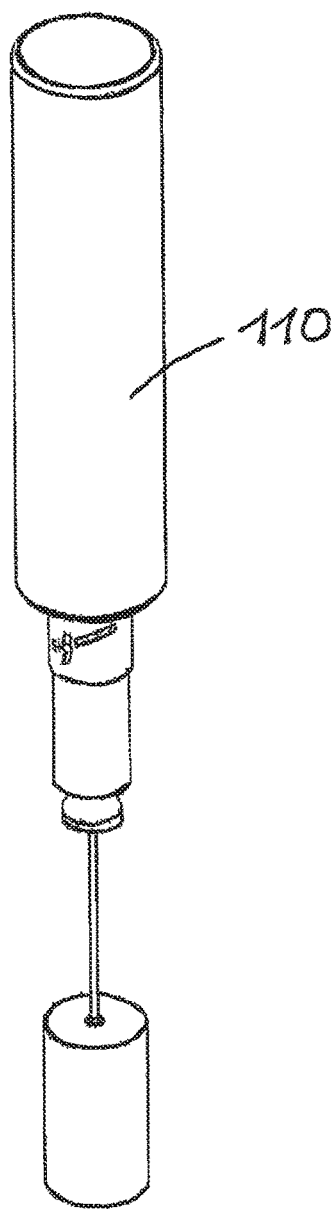
FIG. 5 is a perspective view of a third embodiment of the feeding apparatus disclosed herein.

FIG. 5 shows a third embodiment of the invention. In this embodiment, a feed supply line 110 is provided instead of the feed hopper 10. In this embodiment, the feed supply line 110 runs perpendicularly and extends as far as a feed distribution line, which can run underneath the ceiling of a barn, for example. The feed supply line 110—and any other feed supply lines—is supplied periodically with feed from this feed distribution line. The feed supply lines 110 can run vertically, although they can also run at an incline or can even have short horizontally extending sections. The feed supply line 110 itself is used here as a store in which the feed can be temporarily stored so that it can then be retrieved by the poultry pecking at the pecking block, and the resultant deflection and opening of the feed dispenser 30. The feed dispenser 30 and the pecking block 50*b* of the third embodiment are designed in the same way as in the second embodiment.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A feeding apparatus for poultry comprising:
   a feed source;
   a feed line connected to the feed source;
   a feed valve mechanism arranged in the feed line and which in a closed valve position blocks feed from passing through the feed line and in an open valve position allows feed to pass through the feed line;
   a pendulum rod swingingly mounted in the feeding apparatus and mechanically coupled to the feed valve mechanism;
   wherein the feed source is disposed above the feed valve mechanism, and feed drops out of the feed source under the influence of gravity when the feed valve mechanism is in the open position,
   and
   a pecking block moveably mounted and mechanically coupled to the pendulum rod, wherein the feed valve mechanism is closed when the pecking block is in a neutral position and the feed valve mechanism is open when the pecking block is in a deflected position due to pecking at the pecking block,
   wherein the pendulum rod is swingingly mounted in a pendulum bearing arranged above the pecking block and below the feed valve mechanism.

2. The feeding apparatus according to claim 1, further comprising
   an annular disc having a central through bore that is larger than a cross-sectional dimension of the pendulum rod and through which the pendulum rod extends;
   a pendulum bearing ring fixed to the pendulum rod and defining a pivot fulcrum disposed below the feed valve mechanism and about which the pendulum rod may swing,
   the pendulum bearing ring having an outer diameter larger than the central through bore in the annular disc, whereby the pendulum rod is prevented from slipping downwards out of the central through bore in the annular disc.

3. The feeding apparatus according to claim 1, wherein the annular disc comprises a plurality of lateral discharge holes distributed around its circumference to allow feed to pass through the feed line.

4. The feeding apparatus according to claim 1, wherein the pendulum rod projects upwards a predetermined distance above the feed valve mechanism within the feed line to causes a loosening movement within the feed line when the pendulum rod is deflected, thus counteracting jamming and resultant clogging of the feed within the feed line.

5. The feeding apparatus according to claim 1, wherein the feed valve mechanism comprises a through hole and a valve member mechanically coupled to the pecking block, wherein the through hole is closed when in the neutral position and the through hole is open at least partially when the pecking block is in the deflected position.

6. The feeding apparatus according to claim 5, wherein the valve member is fixed to the pendulum rod above a pendulum bearing and the pecking block is fixed to the bottom end of the pendulum rod.

7. The feeding apparatus according to claim 1, wherein the pecking block includes an abrasive material.

8. The feeding apparatus according to claim 1, wherein the pecking block includes a mineral material.

9. The feeding apparatus according to claim 1, wherein the pecking block has an upper end face onto which the feed falls when in the deflected position and on which at least parts of the feed remains lying.

10. The feeding apparatus according to claim 1, wherein the feed source comprises a valve opening at a bottom end which opens into the feed line and a valve member operably coupled with the valve opening, and the pecking block is fixed to a bottom end of the pendulum rod which carries in an upper end portion thereof the valve member which closes the valve opening when in the neutral position and opens the valve opening at least partially when in the deflected position, the pecking block further being swingingly mounted in the feed line at a position between the upper end portion and the bottom end of the pendulum rod.

11. A feeding apparatus for poultry, comprising:
a feed source;
a feed line in communication with the feed source and having an outlet opening;
a feed valve mechanism disposed within the feed line and between the feed source and the outlet opening;
a pendulum rod swingingly mounted in the feeding apparatus and mechanically coupled to the feed valve mechanism;
an annular disc having a central through bore that is larger than a cross-sectional dimension of the pendulum rod and through which the pendulum rod extends;
a pendulum bearing ring fixed to the pendulum rod and defining a pivot fulcrum disposed below the feed valve mechanism and about which the pendulum rod may swing; and
a pecking block movably suspended from and operably coupled with the pendulum rod, wherein the feed valve mechanism is closed when the pecking block is in a neutral position and the feed valve mechanism is open when the pecking block is in a deflected position.

12. The feeding apparatus of claim 11, wherein the annular disc comprises a plurality of lateral discharge holes distributed around its circumference to allow feed to pass through the feed line.

13. The feeding apparatus of claim 12, wherein the outer diameter of the pendulum bearing ring and the diameter of the through bore of the annular disc cooperate to prevent the pendulum from slipping downwards out of the central through bore of the annular disc.

14. The feeding apparatus of claim 13, wherein lateral deflection of the pecking block opens the feed valve mechanism.

15. The feeding apparatus of claim 11, further comprising a distribution cone suspended beneath the outlet opening.

16. The feeding apparatus of claim 11, wherein the pecking block is a flat, rotationally symmetrical disk of circular cross section.

17. The feeding apparatus of claim 11, wherein the pecking block is an elongated cylindrical body.

18. A method of dispensing feed, the method comprising the steps of:
placing feed into a feed source;
connecting a feed line to the feed source, the feed line having an outlet opening;
placing a feed valve mechanism within the feed line and between the feed source and the outlet opening;
fixedly mounting an annular disc having a central through bore within the feed line;
fixing a pendulum bearing ring about a pendulum rod to define a pivot fulcrum about which the pendulum rod may swing;
placing the pendulum rod within the feed line and through the central through bore of the annular disc, wherein the central through bore is larger than a cross-sectional dimension of the pendulum rod, whereby the pendulum rod extends through the central through bore of the annular disc and is swingingly supported by the annular disc below the feed valve mechanism;
mechanically coupling the pendulum rod to the feed valve mechanism;
and
suspending a pecking block from the pendulum rod, wherein the valve mechanism is closed when the top pecking block is in a neutral position and the feed valve mechanism is open when the pecking block is in a deflected position.

19. The method of claim 18, further comprising the step of providing a plurality of lateral discharge holes distributed around a circumference of the annular disc to allow feed to pass through the feed line.

20. The method of claim 19, further comprising the step of suspending the pendulum rod via a pendulum bearing ring disposed about the pendulum rod and supported by the annular disc.

* * * * *